Sept. 9, 1941.    J. R. MACHAIN    2,255,178
SKID CHAIN APPLIER
Filed March 18, 1941    3 Sheets-Sheet 1

Inventor
John R. Machain

By *Clarence A. O'Brien*

Attorney

Sept. 9, 1941.  J. R. MACHAIN  2,255,178
SKID CHAIN APPLIER
Filed March 18, 1941  3 Sheets-Sheet 2

Inventor
John R. Machain
By Clarence A. O'Brien
Attorney

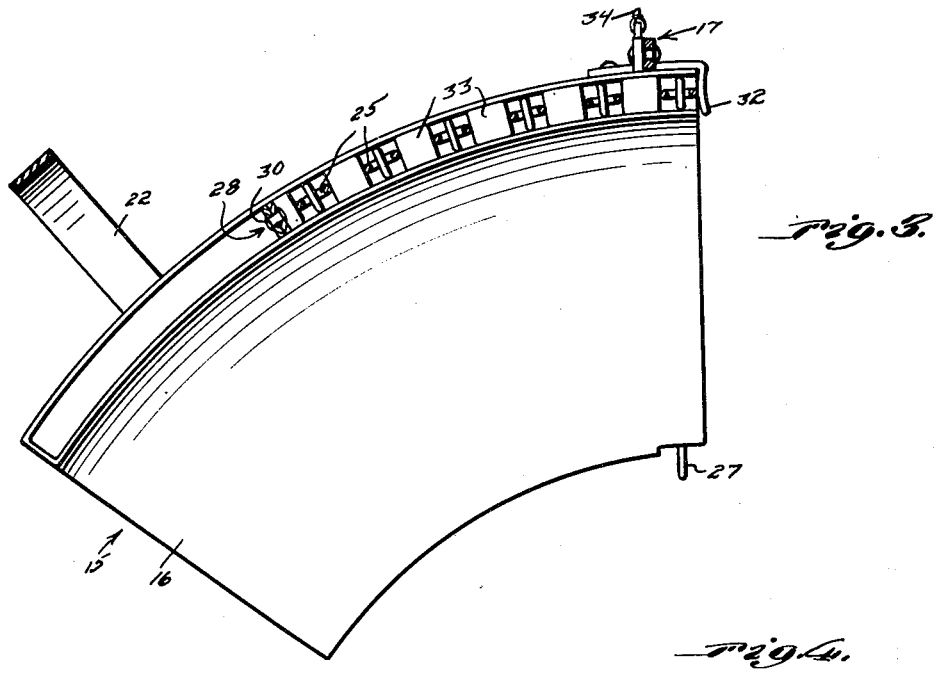
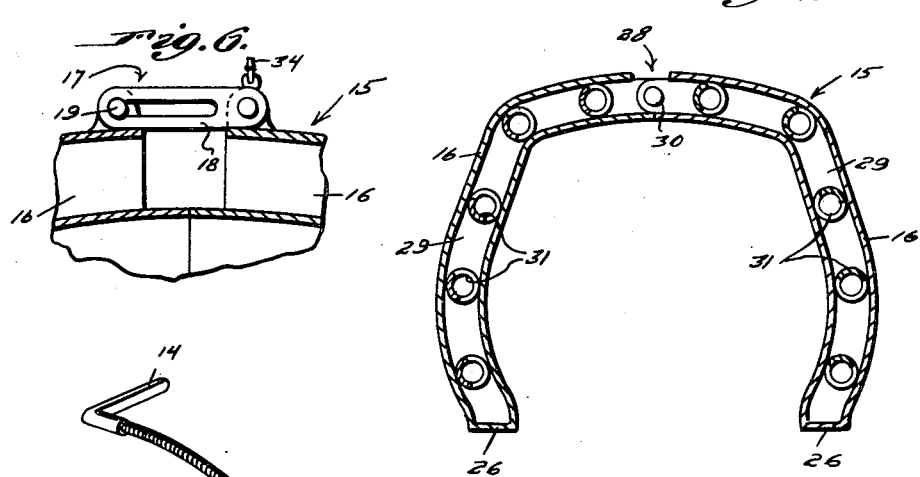
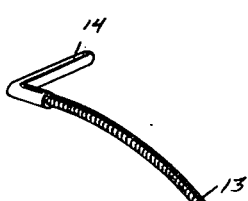
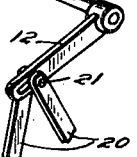

Patented Sept. 9, 1941

2,255,178

UNITED STATES PATENT OFFICE 2,255,178

SKID CHAIN APPLIER

John R. Machain, Pottstown, Pa.

Application March 18, 1941, Serial No. 383,999

3 Claims. (Cl. 152—214)

The present invention relates to new and useful improvements in skid chain appliers for motor vehicles and has for its primary object to provide, in a manner as hereinafter set forth, novel means under the control of the driver whereby a plurality of independent cross chains or sections may be expeditiously applied upon forward movement of the vehicle.

Another very important object of the invention is to provide a skid chain applying means of the aforementioned character embodying a novel construction and arrangement wherein the chains are retained in position at all times on the vehicle ready to be applied.

Other objects of the invention are to provide a skid chain applying means of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in vertical longitudinal section through the housing unit.

Figure 4 is a cross sectional view, taken substantially on the line 4—4 of Figure 1, with the vehicle tire omitted.

Figure 6 is a detail view in cross section through the hinge connection of the housing sections.

Figure 7 is a detail view in perspective of the operating means.

Figure 1:
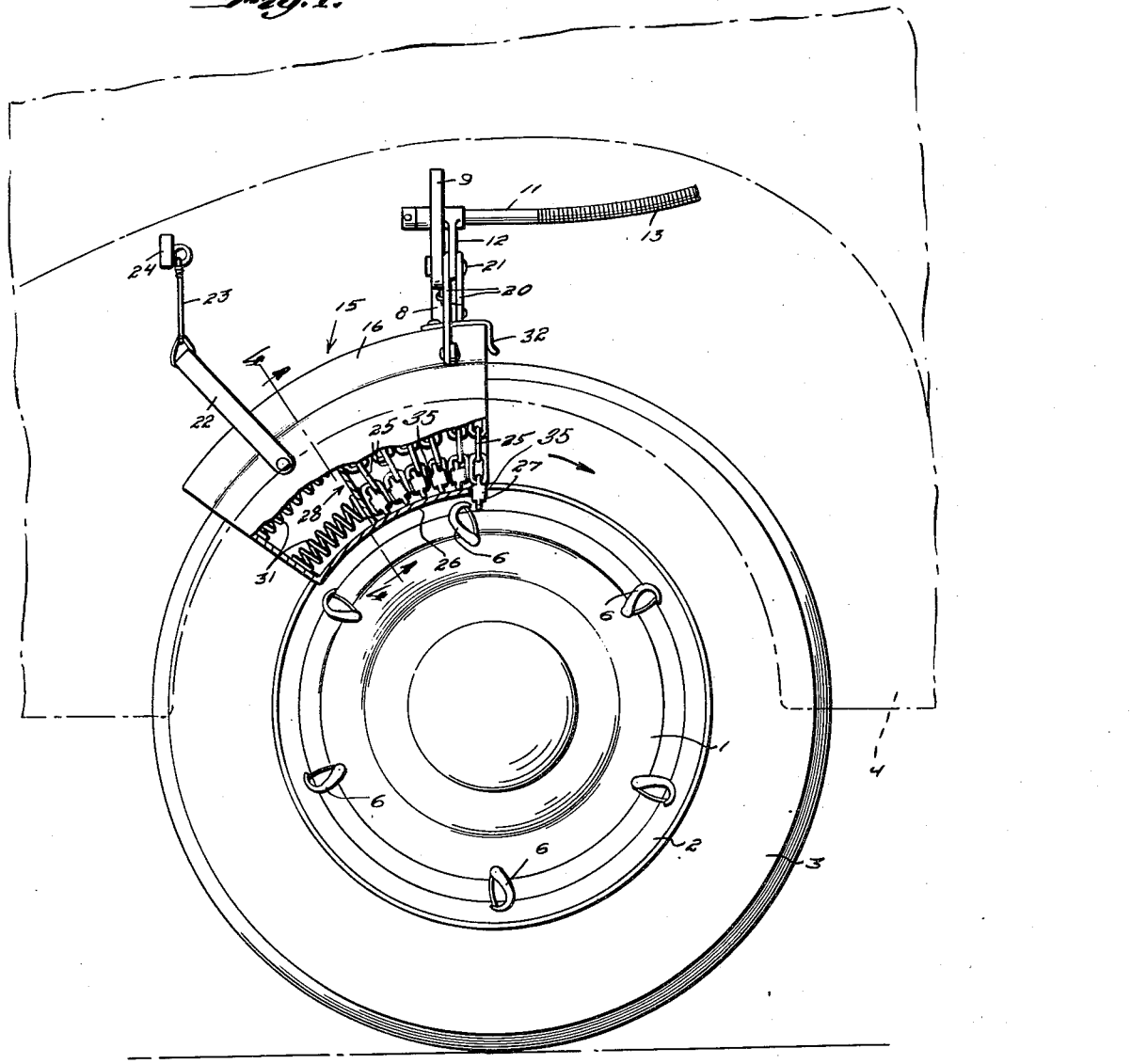
Figure 1 is a side elevation of an apparatus constructed in accordance with the present invention, the lower portion of the outer housing section being broken away in vertical section.
Figure 5:
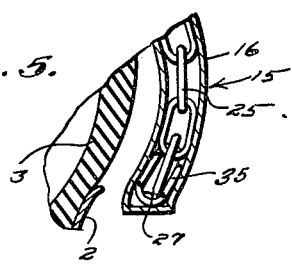
Figure 5 is a fragmentary view in cross section through a side portion of the device.

Referring now to the drawings in detail, it will be seen that the reference numeral 1 designates a rear wheel of a motor vehicle, said wheel including a rim 2 having mounted thereon a pneumatic tire 3. A rear fender of the motor vehicle is indicated at 4.

The embodiment of the present invention which has been illustrated comprises a plurality of rods 5 which are mounted transversely in the wheel 1 at circumferentially spaced points immediately adjacent the rim 2. Mounted on the end portions of the rods 5 are snap hooks 6.

Mounted on a rear axle housing 7 of the vehicle adjacent the wheel 1 is an angular bracket 8 the upper portion of which extends horizontally over the tire 3. Rising from the upper end portion of the bracket 8 is a vertically slotted guide 9 the purpose of which will be presently set forth. Also rising from the horizontally extending upper portion of the bracket 8 is a post 10. Journaled on the post 10 is a shaft 11 having fixed thereon an arm 12. Connected to the shaft 11 is a flexible shaft 13 which extends to a point adjacent the driver's seat of the vehicle and which is provided with an operating handle 14.

The reference numeral 15 designates generally a housing of suitable metal which is adapted to straddle the tire 3 closely adjacent the tread and side walls thereof and which conforms substantially to the cross sectional shape of said tire. Toward this end, the housing 15 includes a pair of complemental sections 16 which are pivotally connected by a loose hinge connection 17. As best seen in Figure 6 of the drawings, this hinge connection 17 includes a link 18 which is pivotally connected to one of the housing sections 16. The link 18 is connected to the other section 16 by a pin and slot connection 19.

Links 20 have one end pivotally connected to the forward end portions of the housing sections 16 on opposite sides of the hinge connection 17. The other ends of the links 20 are coupled to the arm 12 by a pin and slot connection 21. The pin of the connection 21 is operable vertically in the slot of the guide 9.

The rear end of the housing 15 is supported in suspended position relative to the vehicle tire 3 by means including a substantially U-shaped spring 22 having its end portions secured to the sections 16. A flexible element 23 suspends the spring 22 from a suitable bracket 24 beneath the vehicle fender 4.

The housing 15 is closed at its rear end but open at its front end for the reception of a plurality of skid chains 25. The length of the chains 25 is greater than the distance between the bottoms 26 of the sections 16 through the housing 15. Thus, when the chains 25 are stored in the housing 15 the end links 27 of said chains are raised, in which position they are supported by the bottoms 26 of the sections 16. The bottoms 26 terminate short of the forward ends of the housing sections 16, as seen in Figure 1 of the drawings.

Operable in the housing 15 is a follower 28 for feeding the chains 25 toward the forward end of said housing. Referring to Figure 4 of the drawings, it will be observed that the follower 28 includes duplicate sections 29 which are pivotally connected at 30. One of the sections 29 is mounted in each of the housing sections 16. Coil springs 31 in the rear portion of the housing 15 yieldingly urge the follower 28 forwardly in said housing.

Resilient stops 32 are provided on the forward end of the housing 15 for preventing the follower 28 from ejecting the chains 25 from said housing. Spacing elements 33 (see Figure 3) are provided in the upper portions of the housing sections 16 for maintaining the chains 25 in proper position. Of course, the spacing elements 33 are slidable longitudinally in the housing sections 16 with the chains 25. When in lowered position, the forward end of the housing 15 is suspended from the bracket 8 by a flexible element 34 which is connected to said housing at the hinge connection 17 between the sections 16.

Figure 2:
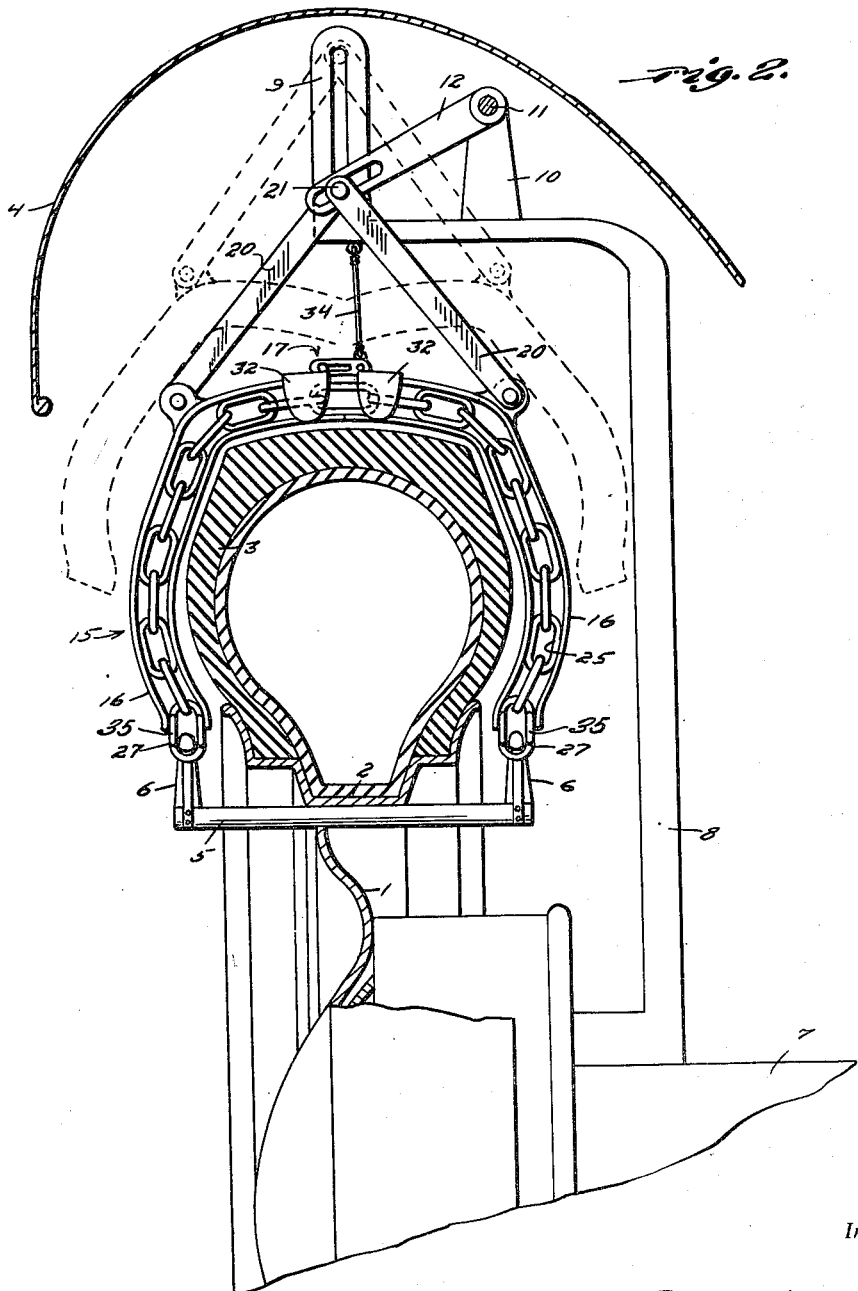
Figure 2 is a cross sectional view through a portion of the vehicle wheel and fender, showing the device of my invention in front elevation.

In operation, the forward end of the housing 15 is supported in raised, open position above the tire 3 by the arm 12 through the medium of the links 20. With the housing 15 in this position the depending end links 27 of the forwardmost chain 25 are out of the path of the hooks 6. When it is desired to apply the chains 25 to the tire 3, the forward end of the housing 15 is lowered by swinging the arm 12 downwardly through the medium of the handle 14, the flexible shaft 13 and the shaft 11. When the housing 15 is thus lowered the load thereof is transferred to the flexible element or cable 34 and the sections 16 are swung to closed position adjacent the tire 3 by gravity with the assistance of the spring 22. In this manner the depending end links 27 of the forwardmost chain 25 are brought into the path of a pair of the hooks 6 by which they are engaged as a vehicle wheel 1 rolls in the direction indicated by the arrow in Figure 1 of the drawings. Thus, the forwardmost chain 25 is pulled out of the open forward end of the housing 15 and said chain is in operative position on the tire 3. The remaining chains 25 are immediately moved forwardly in the housing 15 by the spring pressed follower 28 and the end links 27 of the forwardmost of these chains drop into the path of the next pair of hooks 6 by which they are engaged. This operation is repeated until all of the chains 25 are in position on the tire 3. The end links 27 of the chains 25 have formed thereon wings or the like 35 which are engageable with each other for preventing said end links from turning or twisting in the housing 15. The arm 12 is then swung upwardly to raise the housing 15 and open the sections 16 thereof. This is indicated in dotted lines in Figure 2 of the drawings.

The spacer elements 33, arranged in the respective housing sections 16, are relatively short in comparison with the chains 25, and pass with the chains outwardly of the housing to fall to the ground; the spacing elements in no wise interfering with the operation of the device in the placing of the cross-chains in proper position on the pneumatic tire casing.

It is believed that the many advantages of a skid chain applier constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. Means for applying skid chains to a tire on a vehicle wheel, comprising a housing, for the reception of a plurality of chains, for suspension above the tire, said housing including a pair of hingedly connected sections for straddling the tire, a spring actuated follower in the housing, for feeding the chains toward the front end thereof, and hooks on the wheel engageable with the end portions of the forwardmost chains for successively pulling said chains from the housing and securing said chains in position across the tire.

2. Means for applying skid chains to a tire on a vehicle wheel, comprising a bracket mounted on a vehicle adjacent the wheel thereof, a manually operable arm mounted for vertical swinging movement on said bracket, a housing suspended from the arm for raising and lowering thereby above the tire, said housing for the reception of a plurality of chains and including a pair of hingedly connected sections adapted to straddle the tire, a spring actuated follower in the housing for feeding the chains toward the front end thereof, and means for connecting the chains to the vehicle wheel across the tire.

3. Means for applying skid chains to a tire on a vehicle wheel, comprising a bracket mounted on a vehicle adjacent a wheel thereof, a manually operable arm mounted for vertical swinging movement on said bracket, a housing suspended from the arm for raising and lowering thereby above the tire, said housing for the reception of a plurality of chains and including a pair of hingedly connected sections adapted to straddle the tire, a spring actuated follower in the housing for feeding the chains toward the front end thereof, and means for connecting the chains to the vehicle wheel across the tire, said means including a plurality of rods mounted transversely in the wheel at circumferential points, and hooks on said rods engageable with the end links of the forwardmost chains.

JOHN R. MACHAIN.